(12) United States Patent
She et al.

(10) Patent No.: US 7,912,141 B2
(45) Date of Patent: Mar. 22, 2011

(54) PRE-CODING METHOD FOR MIMO SYSTEM AND APPARATUS USING THE METHOD

(75) Inventors: Xiaoming She, Beijing (CN); Jingxiu Liu, Beijing (CN); Lan Chen, Beijing (CN); Kenichi Higuchi, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 691 days.

(21) Appl. No.: 11/875,600

(22) Filed: Oct. 19, 2007

(65) Prior Publication Data
US 2008/0095258 A1   Apr. 24, 2008

(30) Foreign Application Priority Data
Oct. 19, 2006   (CN) .......................... 2006 1 0135791

(51) Int. Cl.
*H04L 1/02* (2006.01)
*H04B 7/02* (2006.01)
(52) U.S. Cl. .................... 375/267; 375/395; 375/316
(58) Field of Classification Search .................. 375/260, 375/267, 295, 316, 315
See application file for complete search history.

(56) References Cited

U.S. PATENT DOCUMENTS

| 7,676,007 | B1 * | 3/2010 | Choi et al. ................... | 375/347 |
| 2006/0039489 | A1 | 2/2006 | Ikram et al. | |
| 2006/0093065 | A1 * | 5/2006 | Thomas et al. ............... | 375/299 |
| 2006/0209980 | A1 | 9/2006 | Kim et al. | |
| 2007/0291868 | A1 * | 12/2007 | Olesen et al. ................ | 375/267 |
| 2008/0080459 | A1 * | 4/2008 | Kotecha et al. .............. | 370/342 |
| 2008/0089442 | A1 * | 4/2008 | Lee et al. ..................... | 375/299 |

OTHER PUBLICATIONS

European Search Report dated Mar. 5, 2008; EP Patent Application No. 07020307.0.
Samanta, et al., "Codebook Adaptation for Quantized MIMO Beamforming Systems," Asilomar Conference on Signals, Systems, and Computers, Oct. 28, 2005, pp. 376-380, XP010900022, Piscataway, NJ, USA, IEEE, ISBN: 1-4244-0131-3, abstract sections I, III.
Huang, et al., "A Novel Receiver Adided Beamforming Technique," International Symposium on Personal, Indoor and Mobile Radio Communications, Sep. 11, 2005, pp. 2447-2451, XP010928130, Piscataway, NJ, USA, IEEE, ISBN: 978-3-8007-29, abstract; figures 3, 4, Sections I, III.A., III.B.
European Search Report dated Mar. 6, 2009, App. No. 07 020 307.0-1237, 10 pages.
Kim, et al., "Random Beamforming in MIMO Systems Exploiting Efficient Multiuser Diversity," Scientific Computing Lab, Dept. of Electrical Engineering and Computer Science, Korea Advanced Instriute of Science & Technology, Daejeon, Rep. of Korea, IEEE 0-7803-8887, pp. 202-205.

* cited by examiner

*Primary Examiner* — Chieh M. Fan
*Assistant Examiner* — Freshteh N Aghdam
(74) *Attorney, Agent, or Firm* — Blakely, Sokoloff, Taylor & Zafman LLP (57) ABSTRACT

A pre-coding method for a MIMO system and an apparatus using the same are described. In the method, a receiver determines a corresponding codebook from a multi-codebook including multiple codebooks according to a location of a resource block, selects a corresponding codeword index from the determined codebook and transmits the index to a transmitter; the transmitter determines the corresponding codebook from the multi-codebook including multiple codebooks according to the location of the resource block where transmission data is to be transmitted, selects a corresponding codeword from the determined codebook according to the codeword index and performs pre-coding for the transmission data with the selected codeword. The pre-coding is performed with the multi-codebook in the present invention, which increases a diversity of pre-coding matrixes, so dynamic fluctuation range of a equivalent channel is improved and thus the performance of multi-user scheduling is enhanced effectively.

11 Claims, 7 Drawing Sheets

PRE-CODING METHOD FOR MIMO SYSTEM AND APPARATUS USING THE METHOD

PRIORITY

The present application claims priority to and incorporates by reference the entire contents of Chinese priority document 200610135791.4, filed in China on Oct. 19, 2006.

FIELD OF THE INVENTION

The present invention relates to a pre-coding and multi-user scheduling technology in a multi-antenna wireless communication system, and more particularly to a pre-coding method for a MIMO system and an apparatus using the method.

BACKGROUND OF THE INVENTION

A future wireless communication system requires a higher information transmission rate and communication quality. In order to realize the aim with limited frequency resources, MIMO (Multi Input Multi Output) technology has become one of the necessary technical means in the future wireless communication.

In the MIMO system, a signal is transmitted through multiple antennas at transmit-side and the signal is received through multiple antennas at the receive-side. Researches show, compared with traditional single antenna transmission methods, MIMO technology may improve channel capacity significantly and thus the information transmission rate.

Transmission method adopting pre-coding in the MIMO system may effectively improve a performance of the MIMO system. A basic idea of the pre-coding is to pre-process transmission data according to current channel information before the transmission data is transmitted, including linear processing and non-linear processing, etc.

The MIMO pre-coding is a kind of closed loop transmission technology and can be divided into two types according to required forms of feedback information, which are codebook based pre-coding and non-codebook based pre-coding.

In the codebook based MIMO pre-coding, a codebook is pre-set at the transmit-side and receive-side before communication and the codebook includes several pre-coding codewords. Before the transmission of each resource block (RB), the receive-side will select a best pre-coding codeword from the codebook according to current channel characteristics (at this time, if the transmit-side performs pre-coding with this codeword and then transmits the signal result, the receive-side achieves the best performance), and feed back an index corresponding to the codeword in the codebook to the transmit-side. The transmit-side selects the codeword corresponding to the index from the codebook to perform the pre-coding for the transmission data according the feedback information. Therefore, in the codebook based pre-coding, the form of the feedback information is the index corresponding to the codeword.

Compared with the non-codebook based pre-coding, the codebook based pre-coding may effectively reduce the feedback overhead of the channel and is a more practical pre-coding technology.

In a conventional solution, the codebook based pre-coding technology uses a single fixed codebook for all resource blocks in a time and frequency space.

For the multi-user scheduling that considers fairness to users, the larger a fluctuation of the channel characteristic of the user is, the bigger a gain of the scheduling (multi-user diversity gain) is. However, for a case that the fluctuation of a channel, such as a Rician channel, slow fading channel or related channel, is not large, when a single fixed codebook is adopted, since the size of the codebook is limited (limited by the feedback overhead), the fluctuation of the equivalent channel after the pre-coding with the codeword in the codebook is still inadequate, which leads to losses of the multi-user scheduling performance.

SUMMARY OF THE INVENTION

A pre-coding method for MIMO system and apparatus using the method. In one embodiment, a pre-coding method for a MIMO system, comprises determining, by a receiver, a corresponding codebook from a multi-codebook including multiple codebooks according to a location of a resource block, selecting a corresponding codeword index from the determined codebook and transmitting the index to a transmitter; determining, by the transmitter, the corresponding codebook from the multi-codebook including multiple codebooks according to the location of the resource block where transmission data is to be transmitted, selecting a corresponding codeword from the determined codebook according to the codeword index and performing pre-coding for the transmission data with the selected codeword.

DETAILED DESCRIPTION OF THE INVENTION

Embodiment of the present invention aim include a pre-coding method for a multi input multi output system and an apparatus using the method in order to improve a multi-user scheduling performance.

In order to achieve the above aim, according to an embodiment of the present invention, a pre-coding method for a multi input multi output system is provided. In the method, a receiver determines a corresponding codebook from a multi-codebook including multiple codebooks according to a location of a resource block, selects a corresponding codeword index from the determined codebook and transmits the index to a transmitter; and the transmitter determines the corresponding codebook from the multi-codebook including multiple codebooks according to the location of the resource block where transmission data is to be transmitted, selects a corresponding codeword from the determined codebook according to the codeword index and performs pre-coding for the transmission data with the selected codeword.

According to an embodiment of the present invention, the receiver and the transmitter determine the corresponding codebook from the multi-codebook including multiple codebooks according to a subframe and/or subband where the resource block locates.

According to an embodiment of the present invention, resource blocks of subframes at different time periodically and sequentially use multiple codebooks in the multi-codebook with an interval of one or more subbands, and/or resource blocks of subbands at different frequencies periodically and sequentially use multiple codebooks in the multi-codebook with an interval of one or more subbands.

According to an embodiment of the present invention, the multi-codebook is obtained by left handed multiplying a single codebook by a unitary matrix.

According to an embodiment of the present invention, the single codebook is a non-unitary codebook or a unitary codebook.

In order to achieve the above aim, according to another embodiment of the present invention, a transmitter with an inverse fast Fourier transform module, a parallel-serial transform and cycle prefix insertion module and a first antenna is provided. The transmitter includes: a scheduler for receiving channel feedback information including a codeword index and a channel quality indicator returned from a user, and performing scheduling and control according to the channel feedback information and a scheduling rule; a user data mapping module for mapping data to be transmitted of each user into a resource block; a multi-codebook storage and codeword selection module for determining a corresponding codebook from a multi-codebook including multiple codebooks according to a location of the resource block, and selecting a corresponding codeword from the multi-codebook according to the codeword index; a pre-coding module for performing pre-coding for corresponding data to be transmitted with the selected codeword.

According to another embodiment of the present invention, the multi-codebook storage and codeword selection module determines the corresponding codebook from the multi-codebook including multiple codebooks according to a subframe and/or subband where the resource block locates.

According to another embodiment of the present invention, the multi-codebook is obtained by left handed multiplying a single codebook by a unitary matrix.

According to another embodiment of the present invention, the single codebook is a non-unitary codebook or a unitary codebook.

In order to achieve the above aim, according to still another embodiment of the present invention, a receiver with a second antenna, a cycle prefix removing and parallel-serial transform module and a fast Fourier transform module is provided. The receiver further includes: a received data acquisition and feedback module, for performing channel estimation for a received signal and obtaining and outputting transmission data transmitted to the receiver, and for determining a corresponding codebook from a multi-codebook including multiple codebooks according to a location of a resource block and selecting a corresponding codeword index from the determined codebook and transmitting the index to a transmitter.

According to still another embodiment of the present invention, the received data acquisition and feedback module specifically includes:

a channel estimation module for performing channel estimation and estimating a current channel characteristic matrix;

a multi-codebook storage and codeword selection module for determining the corresponding codebook from the multi-codebook including multiple codebooks according to the estimated channel characteristic and the location of the resource block, selecting the corresponding codeword index from the determined codebook and transmitting the codeword index and a channel quality indicator to the transmitter;

a MIMO detecting module for performing MIMO detection on the received signal according to a result of the channel estimation and acquiring the transmission data.

According to still another embodiment of the present invention, the multi-codebook storage and codeword selection module determines the corresponding codebook from the multi-codebook including multiple codebooks according to a subframe and/or subband where the resource block locates.

According to still another embodiment of the present invention, the multi-codebook is obtained by left handed multiplying a single codebook by a unitary matrix.

According to still another embodiment of the present invention, the single codebook is a non-unitary codebook or a unitary codebook.

Embodiments of the present invention perform pre-coding for resource blocks with the codebook in the multi-codebook and the selected codebook is related with the location of the resource block. Researches on the multi-user information theory show the scheduling gain, i.e. the multi-user diversity gain, is related with the dynamic fluctuation range of the channel. The larger the fluctuation of the channel is, the bigger the scheduling gain is. For the pre-coding MIMO system, the equivalent channel is $H_{equ}=HF$, wherein H represents the actual channel and F represents the pre-coding matrix. In one embodiment of the method of the present invention, the pre-coding method with the multi-codebook is adopted and a diversity of F is increased so that the dynamic fluctuation range of the equivalent channel is improved and thus the performance of multi-user scheduling is enhanced effectively.

In one embodiment of the present invention, a multi-codebook is adopted when performing MIMO pre-coding at transmit-side, i.e. in a communication procedure, different codebooks are adopted to perform pre-coding for different resource blocks (RBs) in order to improve user scheduling performance.

Here, for simplicity of descriptions, one codebook in a conventional pre-coding mechanism is named as a single codebook and multiple codebooks in and embodiment of the present invention are named as a multi-codebook.

The above different resource blocks can be resource blocks in different time domains or in different frequency domains or different in both time domains and frequency domains.

Since the multi-codebook is adopted in the MIMO pre-coding in the method, embodiments of the present invention, a design of the multi-codebook is explained first. An acquisition process of the multi-codebook is described as follows.

Firstly, a single codebook $F=\{F_1, F_2, \ldots, F_C\}$ is obtained. There are many conventional methods in designing the single codebook $F=\{F_1, F_2, \ldots, F_C\}$ and the following references disclose design methods of a single codebook:

D. J. Love, R. W. heath and T. Strohmer, "Grassmannian beamforming for multiple-input multiple-output wireless systems," IEEE Trans. Inf. Th., vol. 49, no. 10, pp. 2735-2747, October 2003.

B. M. Hochwald, T. L. Marzetta, T. J. Richardson, W. Sweldens, and R. Urbanke, "System design of unitary space-time constellations," IEEE Trans. Info. Th., vol. 46, pp. 1962-1973, September 2000.

Then a multi-codebook $\tilde{F}=\{F^{(1)}, F^{(2)}, \ldots, F^{(L)}\}$ is obtained according to the single codebook F, wherein the multi-codebook may be obtained by left-handed multiplying the single codebook F by a unitary matrix, i.e. $F^{(l)}=Q^{(l)}F, l=1, \ldots, L$. $Q^{(l)}$ is a unitary matrix that can be obtained randomly or by a Givens rotation method or by directly using a unitary diagonal matrix.

According to the embodiment, the multi-codebook is created by left-handed multiplying the single codebook F by a unitary matrix, since a distance between codewords in the codebook can be guaranteed to keep unchanged by such multiplication. In other words, each codebook in the multi-codebook is guaranteed to be optimum as the former single codebook.

As mentioned above, the MIMO pre-coding is performed by adopting the multi-codebook in the embodiment, so after acquiring the multi-codebook, the multi-codebook $\tilde{F}$ is used to perform the MIMO pre-coding. In the following, it will be explained as how to use the multi-codebook (utilization rules of the multi-codebook).

In performing the MIMO pre-coding, utilization rules of the multi-codebook (how different resource blocks in time-frequency space use predetermined multiple codebooks) can be divided into the following modes.

1. utilization of codebooks of a multi-codebook is switched in the time domain, i.e. resource blocks of subframes at different time use codebooks in the multi-codebook sequentially;

2. utilization of codebooks of a multi-codebook is switched in the frequency domain, i.e. resource blocks of subbands on different frequencies use codebooks in the multi-codebook sequentially;

3. utilization of codebooks of a multi-codebook is switched in both the time domain and the frequency domain, i.e. the utilization mode is the combination of the above two types.

When the number of the codebooks in the multi-codebook is less than the number of the subframes or the subbands, the codebooks will be circularly used. In the following, the above modes will be explained with reference to specific cases.

Figure 1:
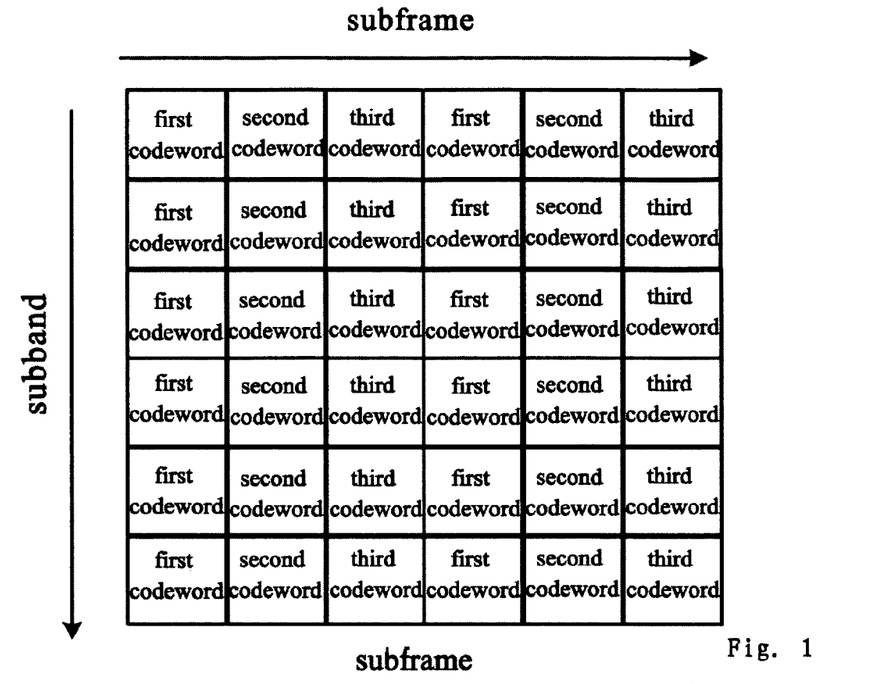
FIG. 1 is a schematic diagram showing a switching utilization pattern of a codebook of a multi-codebook in a time domain, according to an embodiment of the present invention.
Figure 2:
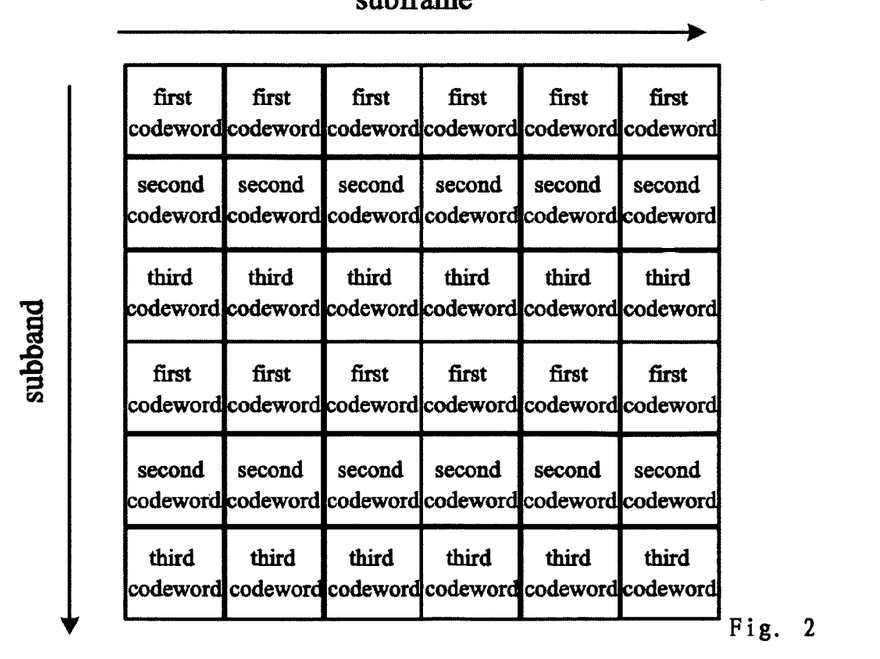
FIG. 2 is a schematic diagram showing a switching utilization pattern of a codebook of a multi-codebook in a frequency domain according to an embodiment of the present invention.
Figure 3:
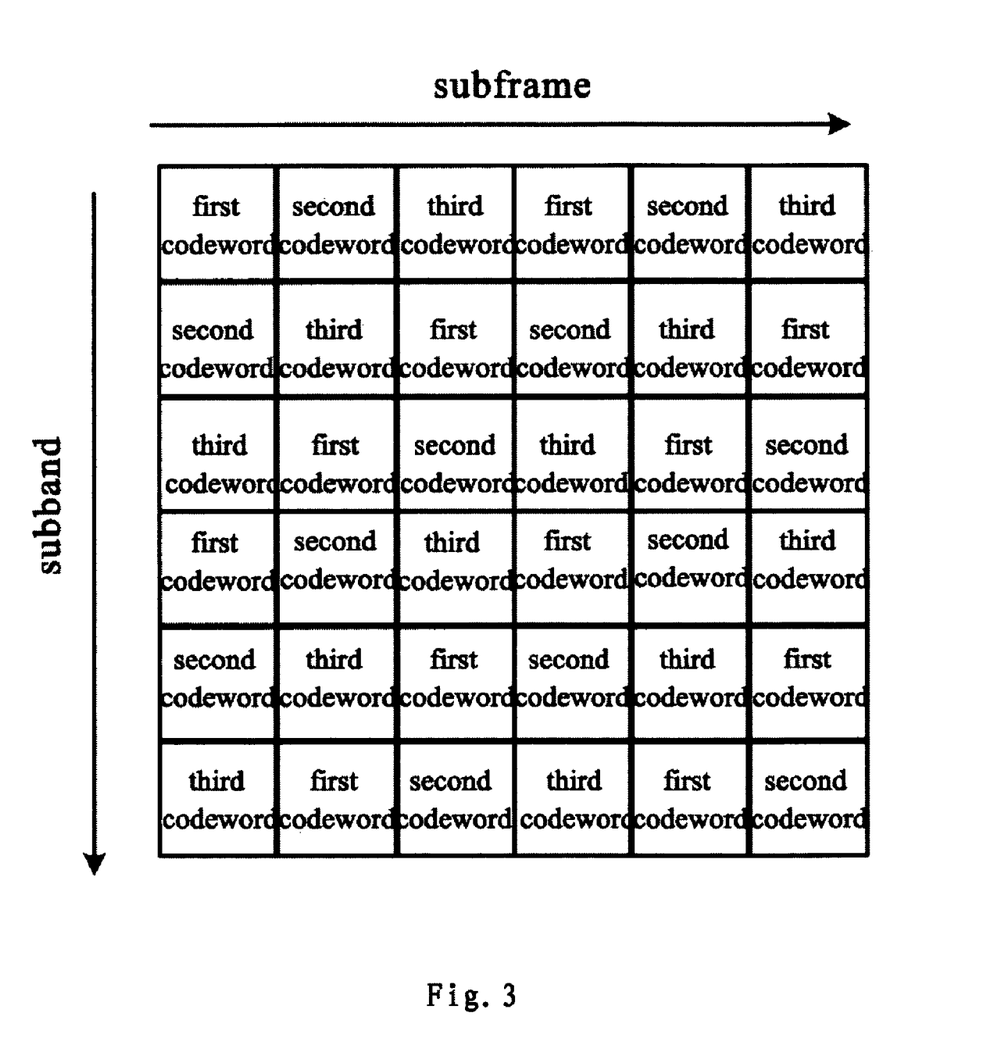
FIG. 3 is a schematic diagram showing a switching utilization pattern of a codebook of a multi-codebook in both time domain and frequency domain concurrently according to an embodiment of the present invention.

Assuming the multi-codebook has three codebooks, which are first codebook, second codebook and third codebook, respectively. FIG. 1, FIG. 2 and FIG. 3 respectively show the utilization of the multi-codebook in the above three modes and FIG. 1, FIG. 2 and FIG. 3 are illustrated with an example of 6 subframes and 6 subbands.

As shown in FIG. 1, for simplicity in description, six subframes listed in the figure are respectively assumed as first subframe, second subframe, ..., sixth subframe. According to the switching utilization mode of the codebooks of the multi-codebook in the time domain, RB in the first subframe uses the first codebook, RB in the second subframe uses the second codebook, RB in the third subframe uses the third codebook, and then since the number of the codebooks is limited and the codebooks need to be circularly used, RB in the fourth subframe uses the first codebook, RB in the fifth subframe uses the second codebook, RB in the sixth subframe uses the third codebook, and the like.

The difference between utilization modes of the multi-codebook in FIG. 2 and that in FIG. 3 is in that the switching conditions are different (in FIG. 2, the codebook is switched in the subband direction, and in FIG. 3, the codebook is switched in both the subband and the subframe directions), which will not be illustrated in details here.

FIG. 1, FIG. 2 and FIG. 3 show several specific examples of switching utilization mode of the codebooks of the multi-codebook (also called utilization modes of the multi-codebook). In the embodiment, an interval of circular switching can be one subframe (as shown in FIG. 1 and FIG. 3) or a subband (as shown in FIG. 2 and FIG. 3) and can be multiple subframes or multiple subbands. For example, RBs in the first subframe and in the second subframe use the first codebook, RBs in the third and fourth subframes use the second codebook and RBs in the fifth and the sixth subframes use the third codebook and then such utilization mode is repeated. Of course, it is also possible that an RB in the first subframe uses the first codebook, RBs in the second, third and fourth subframes use the second codebook and RBs in the fifth and the sixth subframes use the third codebook and then such utilization mode is repeated. All the utilization modes can be predetermined by the system.

After the explanation of the design and utilization rule of the multi-codebook, detailed descriptions of the multi-codebook utilization will be explained in combination with a transmitter of base station, a receiver at user's side and a MIMO communication procedure.

Figure 4:
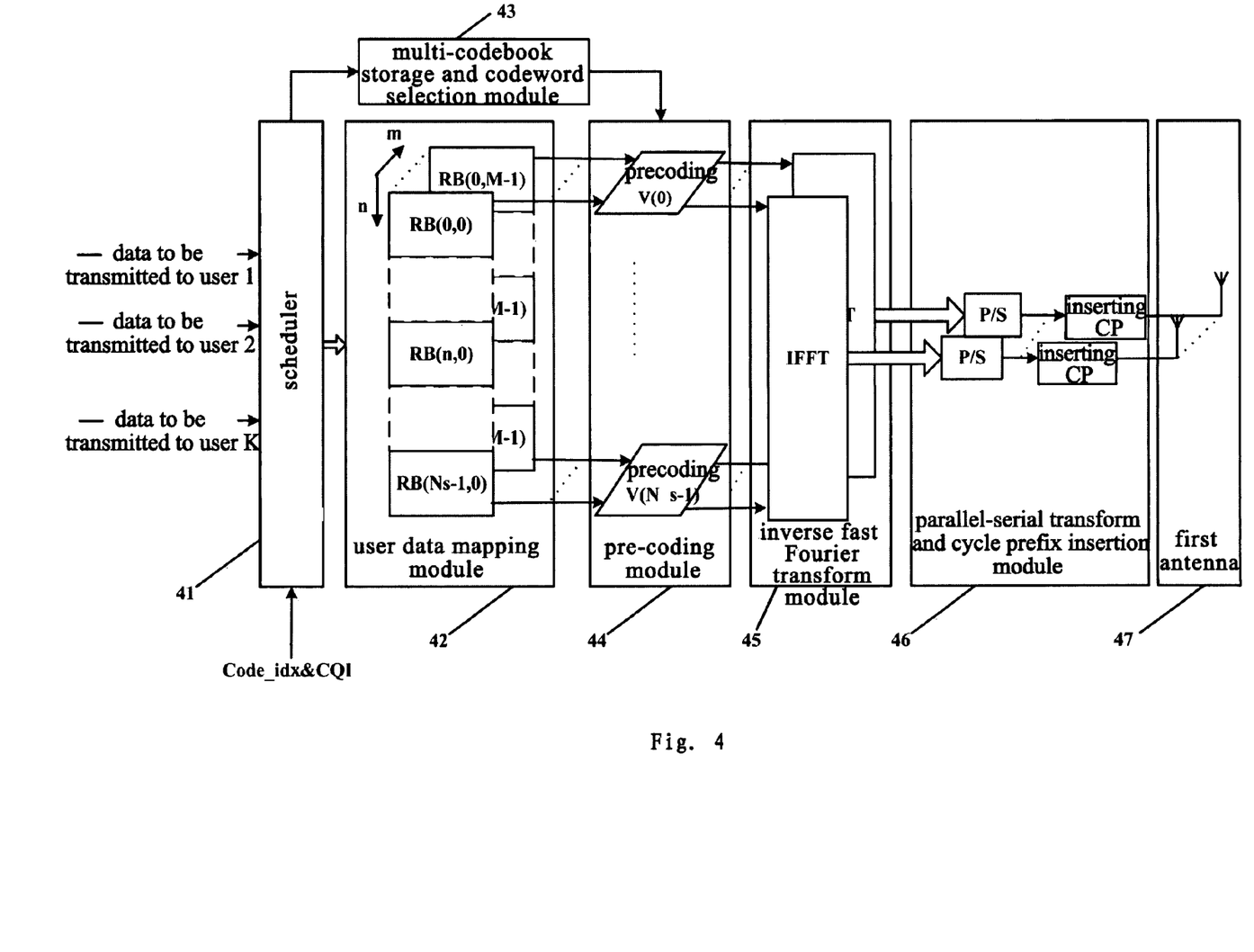
FIG. 4 is a schematic diagram showing architecture of a transmitter of a base station.

The transmitter according to an embodiment of the present invention is shown in FIG. 4, which includes a scheduler 41, a user data mapping module 42, a multi-codebook storage and codeword selection module 43, a pre-coding module 44, an inverse fast Fourier transform module 45, a parallel-serial transform and cycle prefix insertion module 46 and a first antenna 47.

As shown in FIG. 4, the scheduler 41 is configured to receive channel feedback information including a codeword index (code_idx) and a channel quality indicator (CQI) returned from a user, and perform scheduling and control according to the channel feedback information and a scheduling rule.

The user data mapping module 42 is configured to map data to be transmitted of each user to the three dimension space of time, frequency and space in a form of resource blocks.

The multi-codebook storage and codeword selection module 43 is configured to store the multi-codebook and its utilization mode, determine a corresponding codebook from multiple codebooks included in a multi-codebook according to a location of a resource block, select a corresponding codeword from the determined codebook according to the codeword index (code_idx) and notify the signal result to the pre-coding module 44.

The pre-coding module 44 is configured to perform pre-coding for a corresponding resource block with the codeword selected by the multi-codebook storage and codeword selection module 43.

The inverse fast Fourier transform module 45 is configured to perform an inverse fast Fourier transform on the pre-coded signal.

The parallel-serial transform and cycle prefix insertion module 46 is configured to perform a parallel-serial transform on the signal outputted from the inverse fast Fourier transform module 45, insert a cycle prefix in the transformed signal and output the signal result.

The first antenna 47 is configured to transmit the result from the parallel-serial transform and cycle prefix insertion module 46 the parallel-serial transform and cycle prefix insertion module 46.

As mentioned above, the number of the code indexes (code_idx) is the same as that of the resource blocks and from which codebook the code_idx is selected is related with the location of the resource block (or the utilization mode of the multi-codebook). A practical case will be illustrated as an example.

FIG. 1 is taken as an example to explain the utilization mode of the multi-codebook. For simplicity of description, it is assumed that $RB_{ij}$ represents a resource block at the $i^{th}$ subframe and the $j^{th}$ subband, data to be transmitted are scheduled to resource blocks $RB_{11}$, $RB_{21}$ and $RB_{23}$, and the number of the code_idx in the channel feedback information is 3. Since the utilization mode of the codebook of the multi-codebook is switched in the time domain, the codeword indicated by the code_idx corresponding to the $RB_{11}$ is in the first codebook and the codewords indicated by the code indexes (code_idx) corresponding to the $RB_{21}$ and $RB_{23}$ are in the second codebook.

If the utilization mode of the multi-codebook shown in FIG. 2 is adopted, the codeword indicated by the code_idx corresponding to the $RB_{23}$ is in the third codebook and the codewords indicated by the code indexes (code_idx) corresponding to the $RB_{11}$ and $RB_{21}$ are in the first codebook.

The pre-coding module performs pre-coding for the resource blocks corresponding to the selected codewords.

Figure 5:
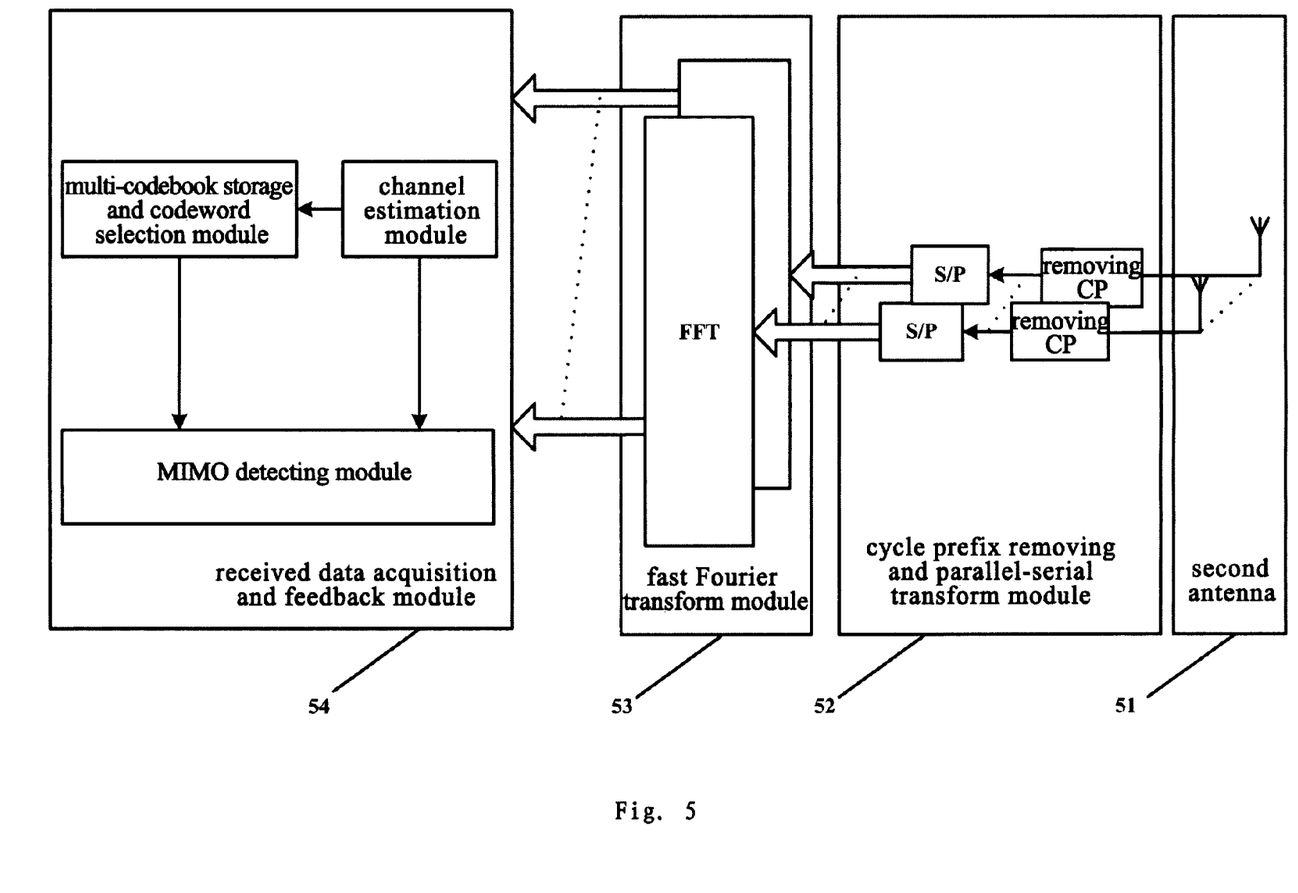
FIG. 5 is a schematic diagram showing architecture of a receiver at a user's side.

The receiver according to an embodiment of the present invention is shown in FIG. 5, which includes a second antenna 51, a cycle prefix removing and parallel-serial transform module 52, a fast Fourier transform module 53, and a received data acquisition and feedback module 54.

The second antenna 51 is configured to receive all the signals in the space.

The cycle prefix removing and parallel-serial transform module 52 is configured to remove the cycle prefix from the signal received by the antenna and perform the parallel-serial transform for the signal and output the signal result.

The fast Fourier transform module 53 is configured to perform the fast Fourier transform on the signal result from the cycle prefix removing and parallel-serial transform module 52.

The received data acquisition and feedback module 54 is configured to perform channel estimation and obtain and output the signal transmitted to the receiver. At the same time the received data acquisition and feedback module 54 feeds back the channel feedback information including the code index (code_idx) and the channel quality indicator (CQI) to the transmitter.

The received data acquisition and feedback module 54 specifically includes a channel estimation module, a multi-codebook storage and codeword selection module and a MIMO detecting module.

The channel estimation module performs channel estimation according to pilot symbols in the received signal or other methods and estimate a current channel characteristic matrix.

The multi-codebook storage and codeword selection module selects a codeword expected by the RB from the codebooks of the multi-codebook according to the estimated channel characteristic and the multi-codebook utilization mode, and transmits the channel feedback information including the codeword index (code_idx) corresponding to the codeword expected by the RB and the channel quality indicator (CQI) to the transmitter.

The MIMO detecting module performs MIMO detection on the received signal according to the result of the channel estimation and obtains the original transmission data from the transmitter.

The selection of the codeword index (code_idx) is to firstly determine the location of the RB and the utilization mode of the multi-codebook (switched in the time domain, switched in the frequency domain etc.), then to determine the codeword corresponding to the RB according to the location of the RB and the utilization mode of the multi-codebook and to select a codeword mostly expected by the RB in order to determine the codeword index (code_idx) corresponding to the codeword.

Figure 6:
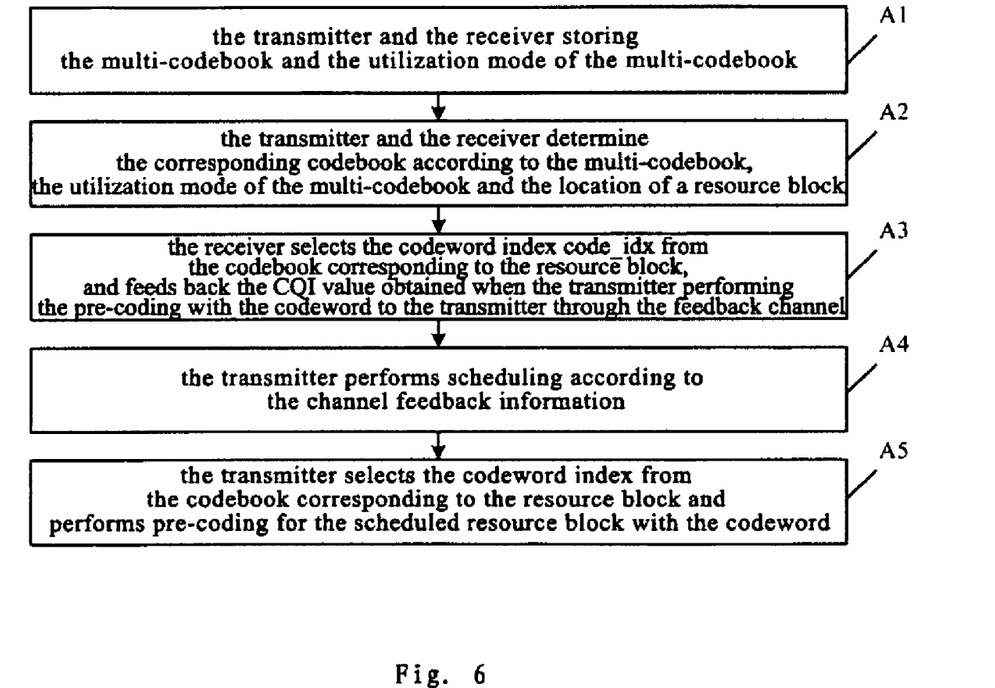
FIG. 6 is a flow chart showing procedures of a method provided by an embodiment of the present invention.

The MIMO scheduling and pre-coding method according to an embodiment of the present invention is shown in FIG. 6 and includes the following steps:

In step A1, the transmitter and the receiver store the multi-codebook and the utilization modes of the multi-codebook.

In step A2, the transmitter and the receiver determine the codebook corresponding to the resource block according to the multi-codebook, utilization mode of the multi-codebook and the location of the resource block to be processed.

In step A3, the receiver select the codeword index (code_idx) from the codebook corresponding to the resource block and feed back CQI value obtained when the transmitter uses the codeword to perform pre-coding to the transmitter through the feedback channel.

In step A4, the transmitter performs scheduling according to the channel feedback information (codeword index and corresponding CQI value). The scheduling algorithm can be any available scheduling algorithm, such as the Max C/I principle and proportion fairness (PF) scheduling principle etc.

In step A5, the transmitter selects the codeword from the codebook corresponding to the resource block according to the codeword index and performs the pre-coding for the resource block of each user by using the codeword.

It is assumed that the codebook corresponding to the resource block is a non-unitary codebook, i.e.

$$F = \left\{ \begin{bmatrix} w_1^{(1)} \\ w_2^{(1)} \end{bmatrix}, \begin{bmatrix} w_1^{(2)} \\ w_2^{(2)} \end{bmatrix}, \ldots, \begin{bmatrix} w_1^{(C)} \\ w_2^{(C)} \end{bmatrix} \right\}.$$

The codebook includes C codewords and the Cth codeword is $[w_1^{(c)}, w_2^{(c)}]^T$. In addition, each receiver includes one receive antenna and the channel characteristic matrix of user k is $H^{(k)} = [h_1^{(k)}, k_2^{(k)}]$.

Accordingly, in step A3, a receiving SNR when each codeword in the codebook is adopted to perform the pre-coding and transmission is computed according to the channel characteristics, the codeword with the largest receiving SNR is selected as the expected codeword and the codeword index is $$\text{code\_idx} = \arg_c \{\max(H^{(k)}[w_1^{(c)}, w_2^{(c)}]^T)/\sigma^2\},$$

and the CQI is determined according to the receiving SNR corresponding to the code_idx, which is the largest AMC parameter in the case of this receiving SNR ($SNR = (H^{(k)} [W_1^{(code\_idx)}, W_2^{(code\_idx)}]^T)/\sigma^2$).

The above apparatus, system and method can be applied to the MIMO transmission manners such as Beamforming (BF) transmission, Spatial Division Multiplexing (SDM) transmission and Spatial Division Multiple Access (SDMA) transmission. The above mentioned single codebook can be a non-unitary codebook (the codeword in the codebook is a unit vector) or a unitary codebook (i.e. the codeword in the codebook is a unitary matrix).

FIGS. 7-10 are diagrams showing simulation results according to an embodiment of the present invention and the simulation conditions are as follows.

The number of the antennas in the transmitter of the base station is 4, the number of the antennas in the receiver at user's side is 1, the channel is a TU six path channel, the bandwidth is 10 MHz, the number of the subcarriers is 1024, the number of the subbands is 32 and the scheduling algorithm is the PF (packet fair) scheduling.

Figure 7:
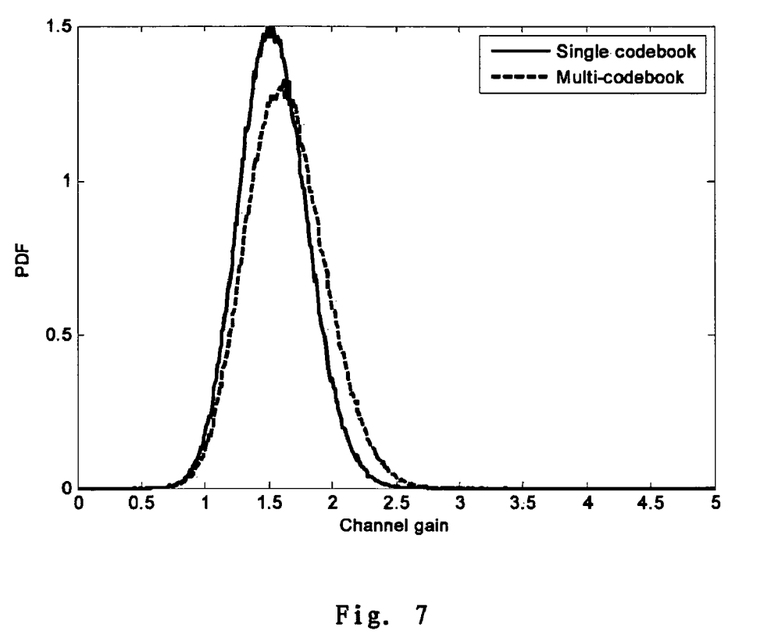
FIG. 7 is a schematic diagram showing a comparison of a channel fluctuation between a method of an embodiment of the present invention and a conventional method.
Figure 8:
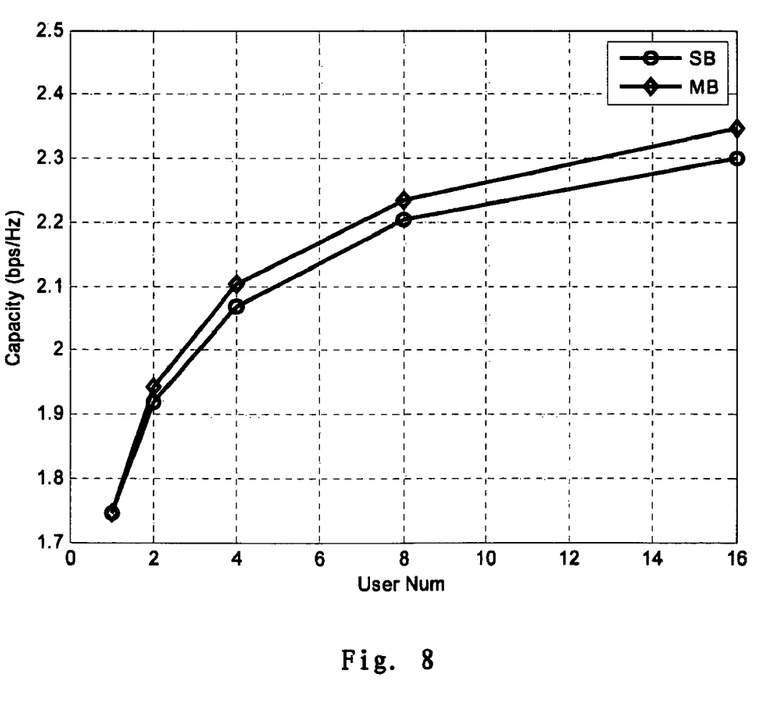
FIG. 8 is a schematic diagram showing a system performance comparison for a Rician channel between a method of an embodiment of the present invention and a conventional method.
Figure 9:
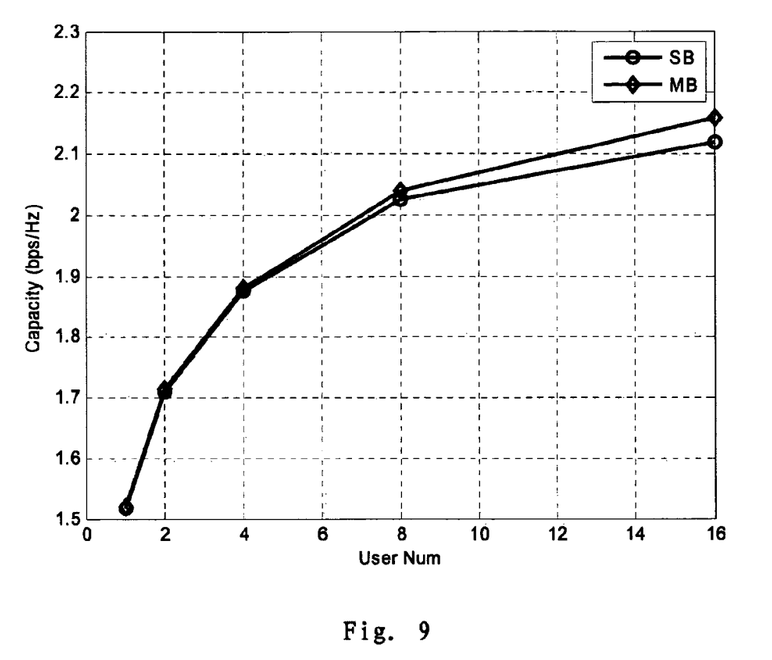
FIG. 9 is a schematic diagram showing a system performance comparison for a slow fading channel between a method of an embodiment of the present invention and a conventional method.
Figure 10:
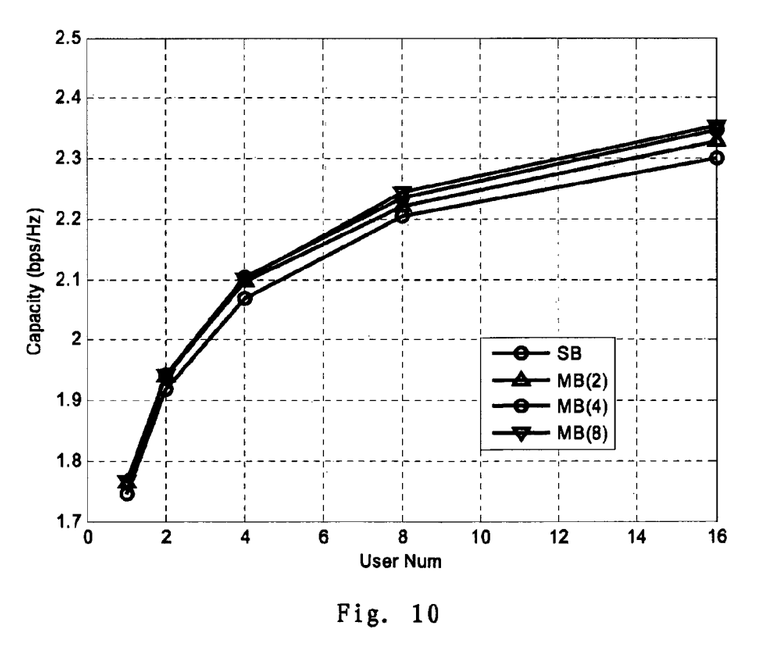
FIG. 10 is a schematic diagram showing an influence of the number of codebooks on system performance according to an embodiment of the present invention.

FIG. 7 shows that the fluctuation of the channel according to the method of an embodiment of the present invention is higher than that of the conventional method. FIG. 8 and FIG. 9 show that the present invention can achieve a better system performance in the Rician and slow fading channels. In addition, FIG. 10 shows that in the present invention, the larger the number of the adopted codebooks is, the better the system performance is.

The above description is only about the preferred embodiments of the present invention. It will be apparent to those skilled in the art that various modifications and variations can be made in the present invention without departing the principle of the present invention. Thus, it is intended that the present invention covers the modifications and variations of this invention.

The invention claimed is:

1. A pre-coding method for a MIMO system, comprising:
   determining, by a receiver, a corresponding codebook from a multi-codebook including multiple codebooks according to a location of a resource block, selecting a corresponding codeword index from the determined codebook and transmitting the index to a transmitter, wherein the multi-codebook is obtained by left handed multiplying a single codebook by a unitary matrix;
   determining, by the transmitter, the corresponding codebook from the multi-codebook including multiple codebooks according to the location of the resource block where transmission data is to be transmitted, selecting a corresponding codeword from the determined codebook according to the codeword index and performing pre-coding for the transmission data with the selected codeword.

2. The method according to claim 1, wherein the receiver and the transmitter determine the corresponding codebook from the multi-codebook including multiple codebooks according to a subframe and/or subband where the resource blocks located.

3. The method according to claim 1, wherein at least one of: resource blocks of subframes at different time periodically and sequentially use multiple codebooks in the multi-codebook with an interval of one or more subbands; and resource blocks of subbands at different frequencies periodically and sequentially use multiple codebooks in the multi-codebook with an interval of one or more subbands.

4. The method according to claim 1, wherein the single codebook is a non-unitary codebook or a unitary codebook.

5. A transmitter comprising an inverse fast Fourier transform module, a parallel-serial transform and cycle prefix insertion module and a first antenna, further comprising:
   a scheduler to receive channel feedback information including a codeword index and a channel quality indicator returned from a user, and to perform scheduling and control according to the channel feedback information and a scheduling rule;
   a user data mapping module to map data to be transmitted of each user into a resource block;
   a multi-codebook storage and codeword selection module to determine a corresponding codebook from a multi-codebook including multiple codebooks according to a location of the resource block, and to select a corresponding codeword from the multi-codebook according to the codeword index, wherein the multi-codebook is obtained by left handed multiplying a single codebook by a unitary matrix;
   a pre-coding module to perform pre-coding for corresponding data to be transmitted with the selected codeword.

6. The transmitter according to claim 5, wherein the multi-codebook storage and codeword selection module determines the corresponding codebook from the multi-codebook including multiple codebooks according to at least one of a subframe and subband where the resource block is located.

7. The transmitter according to claim 6, wherein the single codebook is a non-unitary codebook or a unitary codebook.

8. A receiver comprising a second antenna, a cycle prefix removing and parallel-serial transform module and a fast Fourier transform module, further comprising:
   a received data acquisition and feedback module to perform channel estimation for a received signal and to obtain and output transmission data transmitted to the receiver, and to determine a corresponding codebook from a multi-codebook including multiple codebooks according to a location of a resource block and to select a corresponding codeword index from the determined codebook and transmitting the index to a transmitter, wherein the multi-codebook is obtained by left handed multiplying a single codebook by a unitary matrix.

9. The receiver according to claim 8, wherein the received data acquisition and feedback module specifically comprises:
   a channel estimation module to perform channel estimation and to estimate a current channel characteristic matrix;
   a multi-codebook storage and codeword selection module to determine the corresponding codebook from the multi-codebook including multiple codebooks according to the estimated channel characteristic and the location of the resource block, selecting the corresponding codeword index from the determined codebook and transmitting the codeword index and a channel quality indicator to the transmitter;
   a MIMO detecting module to perform MIMO detection on the received signal according to a result of the channel estimation and to acquire the transmission data.

10. The receiver according to claim 9, wherein the multi-codebook storage and codeword selection module determines the corresponding codebook from the multi-codebook including multiple codebooks according to at least one of a subframe and subband where the resource block is located.

11. The receiver according to claim 10, wherein the single codebook is a non-unitary codebook or a unitary codebook.

* * * * *